US010810235B1

(12) United States Patent
Bakshi (10) Patent No.: US 10,810,235 B1
(45) Date of Patent: Oct. 20, 2020

(54) EFFICIENT REGION IDENTIFICATION USING HIERARCHICAL GEOCODED INFORMATION

(71) Applicant: Amazon Technologies, Inc., Seattle, WA (US)

(72) Inventor: Hrishikesh Bakshi, Toronto (CA)

(73) Assignee: Amazon Technologies, Inc., Seattle, WA (US)

( * ) Notice: Subject to any disclaimer, the term of this patent is extended or adjusted under 35 U.S.C. 154(b) by 631 days.

(21) Appl. No.: 15/618,901

(22) Filed: Jun. 9, 2017

(51) Int. Cl.
| | | |
|---|---|---|
| *G06F 16/00* | (2019.01) | |
| *G06F 16/29* | (2019.01) | |
| *G06F 12/0811* | (2016.01) | |
| *G06F 12/0875* | (2016.01) | |
| *G06F 16/28* | (2019.01) | |
| *G06F 16/22* | (2019.01) | |
| *G06F 16/9537* | (2019.01) | |

(52) U.S. Cl.
CPC .......... *G06F 16/29* (2019.01); *G06F 12/0811* (2013.01); *G06F 12/0875* (2013.01); *G06F 16/2237* (2019.01); *G06F 16/282* (2019.01); *G06F 16/9537* (2019.01); *G06F 2212/283* (2013.01); *G06F 2212/452* (2013.01)

(58) Field of Classification Search
None
See application file for complete search history.

(56) References Cited

U.S. PATENT DOCUMENTS

| | | | | |
|---|---|---|---|---|
| 2004/0205517 | A1* | 10/2004 | Lampert | G01C 21/32 715/249 |
| 2014/0274154 | A1* | 9/2014 | Rana | G06F 16/2379 455/456.3 |
| 2015/0019531 | A1* | 1/2015 | Bursey | G06F 16/29 707/722 |
| 2017/0068689 | A1* | 3/2017 | Sato | G01S 19/50 |
| 2018/0113883 | A1* | 4/2018 | Duan | G06F 16/9027 |

* cited by examiner

*Primary Examiner* — Son T Hoang
(74) *Attorney, Agent, or Firm* — Knobbe, Martens, Olson & Bear, LLP (57) ABSTRACT

Systems are provided for using a hierarchy of geographical areas to efficiently identify regions of interest. The hierarchy of geographical areas may be generated or defined using geocoding. Various regions of interest (e.g., delivery areas, governmental jurisdictions, etc.) may be defined as compositions of the hierarchical geocoded areas. Individual regions may include larger areas corresponding to higher levels of the hierarchy and smaller areas corresponding lower levels of the hierarchy, as needed. Thus, the question "which regions include a specific location" can be answered by determining which hierarchical geocoded areas include the specific location, and which regions include those geocoded hierarchical areas.

20 Claims, 7 Drawing Sheets

| UPPER-LEVEL COMPONENT AREA | REGION | TRANSFORMED REPRESENTATION OF LOWER-LEVEL COMPONENT AREAS WITHIN REGION |
|---|---|---|
| "cd0" | R1 | null |
| "cd1" | R1 | "1" : 0xFFFFFFFF<br>"2" : 0x0000051F |
| "0dh" | R2 | null |

502 — "cd0" row
504 — "cd1" row
506 — "0dh" row

EFFICIENT REGION IDENTIFICATION USING HIERARCHICAL GEOCODED INFORMATION

BACKGROUND

Computing systems can be used to store, process, and/or exchange information in various ways. In an example application, a computing system may determine the geographic region or regions in which a particular geographic location is located. For example, it may be desirable to determine a predefined region in which a particular address is located in order to then determine shipping time estimates or costs, tax estimates, locally-available offers, or the like.

In some scenarios, a database may store records regarding areas that make up particular regions of interest. For example, a database may store, for a particular region of interest such as a governmental jurisdiction, a listing of geographic areas that are within or otherwise associated with the region of interest. The regions or their component geographic areas may be defined by, e.g., latitudinal and longitudinal boundaries or coordinates, a listing of vertex coordinates that define a polygon border, etc.

Some systems use geocoding to store representations of geographic areas that can be more easily worked with. Geocoding is the computational process of transforming geographic location information into data that defines or identifies a location or area in terms of a systematic representation of Earth's surface (or some portion thereof). A computing system can analyze the data to determine which region or regions include a particular geographic location of interest (e.g., the address of a customer).

BRIEF DESCRIPTION OF DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Introduction

The present disclosure is directed to a system that uses a hierarchical representation of geographical areas to efficiently identify regions of interest. The hierarchy may be generated or defined using a geocoding process in which a top-level geographic area (or the entire surface of the Earth) is divided into a set of component areas, each component area is subdivided into a set of smaller component areas, and so on until a desired scale or level of resolution is reached. Individual component areas may then be identified by a unique identifier or other code (e.g., a geohash) that includes information about the hierarchical level of which the component area is a part. Various predefined regions of interest (e.g., delivery areas, governmental jurisdictions, etc.) may be defined as compositions of the hierarchical geocoded areas. For example, individual regions may include larger component areas corresponding to higher levels of the hierarchy and smaller component areas corresponding lower levels of the hierarchy, as needed. Thus, the question of "which predefined regions of interest include a specific location" can be answered by determining which hierarchical geocoded areas include the specific location, and which predefined regions include those geocoded areas.

Some systems may store information regarding geocoded areas at each level of the hierarchy, and then retrieve and analyze the information for all geocoded areas that (1) include an entire region of interest or some portion of a region of interest, or (2) are at least partly included in a region of interest. When determining which regions include a specific location, such systems retrieve and analyze information for all geocoded areas that include the specification location, at all levels of the hierarchy. This can cause processing inefficiencies due to the large number of records that must be obtained for each potential region. For example, if a 9-level hierarchy is used, then 9 separate sets of records are retrieved for each region to be checked. At level 9 (the finest-grained level of resolution in this example, which may include component areas that are 5 meters×5 meters square), a single predefined region such as a governmental jurisdiction or delivery area may encompass a large number of records (e.g., hundreds of thousands, millions, or more). If a system handles a large number of such requests (e.g., tens of thousands of such requests or more per second), significant performance delays and processing inefficiencies may result.

Some aspects of the present disclosure relate to storing data records regarding a subset of hierarchical geocoded areas in a region of interest, rather than storing separate data records for geocoded areas at every level of the hierarchy. A record for a geocoded area in the subset may include information regarding a relatively coarse-grained geocoded area (e.g., in a mid to high level of the hierarchy) that is at least partially within a predefined region of interest. Advantageously, the record can also include a representation of one or more lower-level, finer-grained component areas of the coarse-grained area that are entirely within the predefined region of interest. In this way, the record for a single coarse-grained geocoded area can also provide a more fine-grained representation of which portions of the coarse-grained area are within the predefined region of interest without the necessity of storing separate records for each of the finer-grained component areas. For example, one or more intermediate levels of resolution may be chosen (e.g., not the highest hierarchical level with the most coarse-grained level of resolution, and not the lowest hierarchical level with the most fine-grained level of resolution). Records including information about the intermediate levels may be stored in connection with compressed, simplified, filtered, encoded, or otherwise transformed information regarding one or more lower hierarchical levels. When a predefined region that includes a particular geographic location is to be identified, the records for intermediate level areas that include the geographic location may be retrieved. The transformed information regarding the lower-level, finer-grained component areas in predefined regions of interest may be analyzed to determine whether the geographic location is indeed included in a region, or whether the geographic location is in a coarse-grained area but nevertheless outside of a predefined region of interest. Because fewer records may be stored, maintained, retrieved, processed, etc. without any loss in fine-grained resolution for defining regions of interest, the system can experience or cause less network traffic and overall latency, and greater speed and overall processing efficiency. Some experiments have shown a 10× reduction in total time required to identify regions of interest, in comparison with systems that store, query, and process records for all levels of a geocode hierarchy.

Additional aspects of the present disclosure relate to caching techniques that leverage the aspects discussed above in order to increase the number of cache hits or reduce the number or records that must be cached to maintain a the number of cache hits. In some embodiments, the identifier for geocoded areas, such as a geohash, uniquely identifies the geocoded area as specific component area of a higher-level area, which may be a specific component area of a still higher-level area, etc. Moreover, a target geographic location, such as an address or set of latitude/longitude coordinates, may be converted into an identifier for the lowest-level geocoded area that includes the target geographic location. The target area identifier may then also identify the higher-level areas in which the target area is located. The target area identifier can then be used to determine whether a record for a higher-level area that includes the target area has been cached. If such a record has been cached, the cached record can be analyzed as described above and in greater detail below to determine whether the target area is within a region of interest. Thus, additional queries and database operations may be reduced or avoided altogether.

Although aspects of some embodiments described in the disclosure will focus, for the purpose of illustration, on particular examples of data structures, geocoding specification, region identification algorithms, and applications of region identification the examples are illustrative only and are not intended to be limiting. In some embodiments, the systems and techniques described herein may be applied to other types of data structures, other types of geocoding specification, or other region identification algorithms. Various aspects of the disclosure will now be described with regard to certain examples and embodiments, which are intended to illustrate but not limit the disclosure.

Region Identification System

Figure 1:
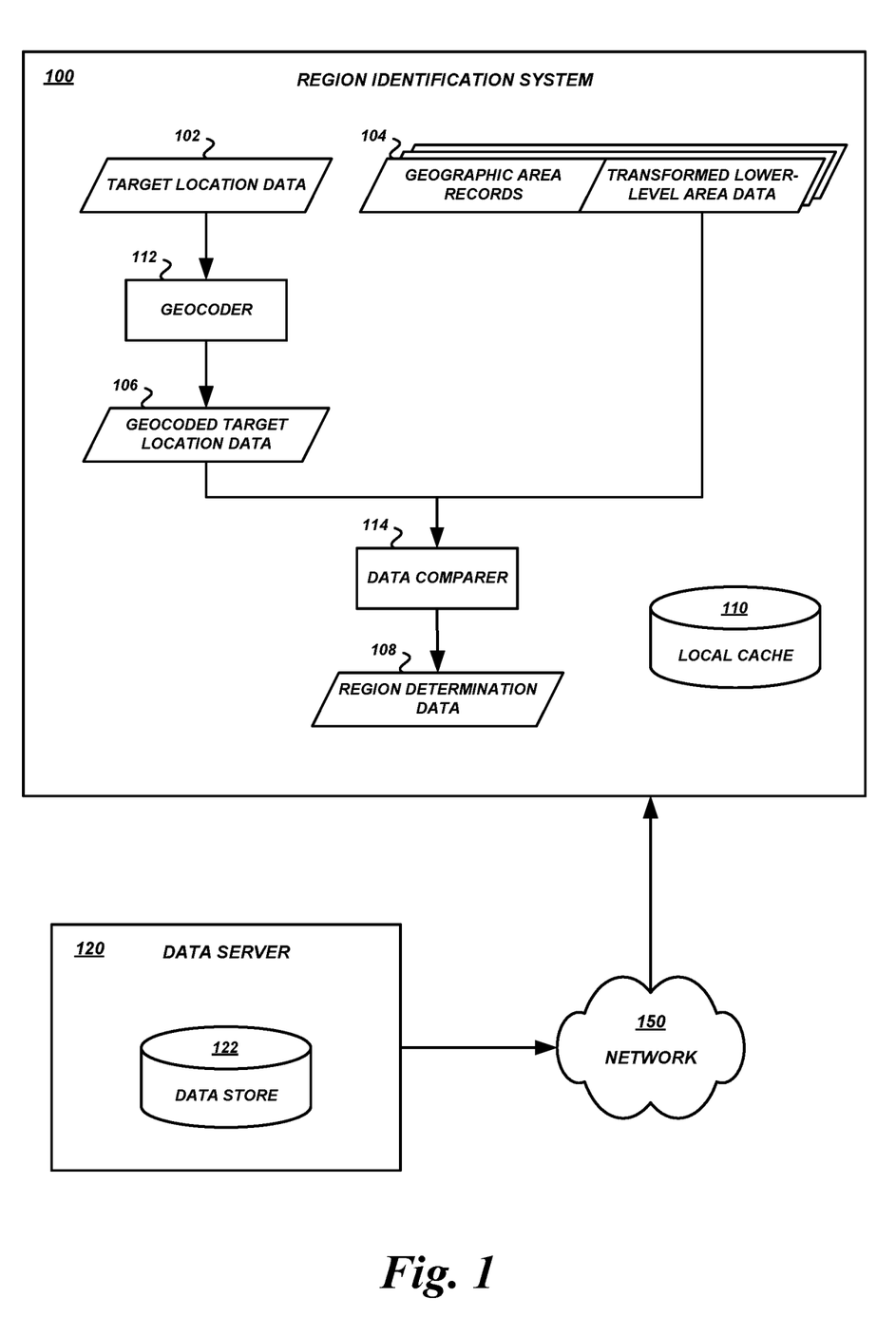
FIG. 1 is a block diagram showing an illustrative computing system that identifies geographic regions containing a particular geographic location according to some embodiments.

FIG. 1 shows a computing environment in which aspects of the present disclosure may be implemented. As shown, the computing environment may include a region identification system 100 and a data server 120. The region identification system 100 and data server 120 may communicate with each other via one or more communication networks 150. A communication network 150 may be a publicly accessible network of linked networks, possibly operated by various distinct parties, such as the Internet. In other embodiments, the network 150 may include a private network, personal area network, local area network, wide area network, cable network, satellite network, cellular telephone network, etc. or a combination thereof, some or all of which may or may not have access to and/or from the Internet.

The region identification system 100 may include various components for providing the features described herein. Illustratively, the region identification system 100 may include a cache 110 for caching information received from the data server 120, a location data encoder 112 for encoding location data to be analyzed against encoded hierarchical area data, and a region identifier 114 for using encoded data to determine whether a target location is within a particular region. The components of the region identification system 100 shown in FIG. 1 and described herein are illustrative only, and are not intended to be limiting. In some embodiments, fewer, additional, and/or alternative components may be implemented by the region identification system 100.

The data server 120 may include various components for providing the features described herein. Illustratively, the data server 120 may include a data store 122 for storing information regarding various geocoded areas and geographic regions. In some embodiments, the data store 122 may be or include a key-value data store, such as a "noSQL" database, object-based database, or dictionary. The components of the data server 120 shown in FIG. 1 and described herein are illustrative only, and are not intended to be limiting. In some embodiments, fewer, additional, and/or alternative components may be implemented by the data server 120. In some embodiments, the region identification system 100 (or portions thereof) may be physically implemented on the same device as the data server 120 (or portions thereof).

The region identification system 100 and/or data server 120 may be implemented on one or more physical server computing devices that provide computing services and resources. In some embodiments, the region identification system 100, data server 120, or individual components thereof may be implemented on one or more host devices, such as blade servers, midrange computing devices, mainframe computers, desktop computers, or any other computing device configured to provide computing services and resources. For example, a single host device may execute one or more instances of a region identification system 100 (or individual components thereof). A computing environment, such as a network computing provider, may include any number of such hosts.

In some embodiments, the features and services provided by the region identification system 100 and/or data server 120 may be implemented as web services consumable via the communication network 150. In further embodiments, the region identification system 100, data server 120, or individual components thereof are provided by one more virtual machines implemented in a hosted computing environment. The hosted computing environment may include one or more rapidly provisioned and released computing resources, such as computing devices, networking devices, and/or storage devices. A hosted computing environment may also be referred to as a cloud computing environment.

In one illustrative embodiment, the region identification system 100 may receive a request to identify regions that include a particular geographic location. The regions may be predefined as comprising or consisting of the component areas of a geocode hierarchy that are within the regions. For example, the component areas within a predefined region may be identified from the boundaries of the regions themselves, as defined by a series of points that define the boundaries of the regions, as vertex points for polygonal boundaries of the regions, etc. Once the individual component areas within the predefined regions are determined, data records are stored indicating the component areas within the predefined regions. Rather than storing records regarding the components areas at every level of the geocode hierarchy that are within the regions, the region identification system 100 may store or access data records for a subset of hierarchy levels, such as data records for one or more intermediate levels.

For example, the surface of the Earth may be geocoded into a 9-level hierarchy, with each level having 32 component areas. Thus, the top level of the hierarchy may include the 32 component areas that cover the entire surface of the Earth. At level two of the hierarchy, the 32 top-level component areas may each be subdivided into 32 component areas that collectively cover the entire surface of a top-level component area. The process may be repeated all the way to level nine, in which each level eight component area is subdivided into 32 separate level nine component areas that are roughly 5 meters by 5 meters in size and that collectively cover the entire surface of a level eight component area. In this example, for each region of interest (e.g., delivery area, tax jurisdiction, etc.), rather than storing information for each set of level one component areas, each set of level two component areas, and so on through level nine, a system may only store information for one or more high or intermediate levels, such as level six. However, the high or intermediate level may be too large/coarse-grained to be used to accurately define certain regions of interest (e.g., a region of interest may include small portions of various level six component areas). Rather than also storing information about all component areas of lower levels separately, this information may be transformed and stored in connection with the corresponding level six areas.

The target geographic location for which regions of interest are to be identified may be represented by target geographic location data 102. In some embodiments, the target geographic location data 102 may include latitude/longitude coordinates, a mailing address, or the like. The target geographic location data 102 may be encoded by a geocoder 112 to produce geocoded target location data 106. For example, the geocoder 112 may produce a geohash of a fine-grained, low-level area that includes or otherwise corresponds to the target geographic location (e.g., a level nine geohash). The region identification system 100 may use the geocoded target location data 106 to identify records of geocoded data for coarser-grained, higher-level areas that include the target location, as described in greater detail below. The identified records 104 can form an intermediate level of the hierarchy. The identified records 104 may be retrieved from a local cache 110, or from a data server 120 via a communication network 150 if the records are not present in the local cache 110.

The identified intermediate-level area records 104 may be associated with individual regions of interest. For example, a particular record 104 may include data for a particular geocoded area, and at least some of the geocoded area may be within a particular region of interest. The record may include or be retrieved in connection with data regarding finer-grained, lower-level component areas that are within the geocoded area and that are entirely within the region of interest. In some embodiments, the data regarding the component areas within the geocoded area and the region may be compressed, simplified, filtered, encoded, or otherwise transformed. For example, the data may be a bit array, with individual elements corresponding to individual component areas. Values of the elements (e.g., 0 or 1) may indicate whether the corresponding component area of the geocoded area is within the region of interest (e.g., 0=not within the area of interest, 1=within the region of interest). In some embodiments, data regarding the component areas within the geocoded area and the region may be stored as a prefix hash tree or a "trie." For example, a prefix hash tree can represent individual geocoded areas as nodes, and the component areas of individual geocoded areas can be represented as child nodes. In some embodiments, strings of characters representing the component areas themselves may be stored, rather than bit arrays, prefix hash trees, or the like.

A data comparer may 114 may compare the transformed representation of component areas in the region of interest (e.g., the bit array) with a similar encoding of the geocoded target area data (e.g., a bit array with only one element having a value of 1, corresponding to the geocoded target area). Illustratively, the comparison may be a bitwise "AND" operation in the case of two bit arrays. If it is determined that the geocoded target area is one of the component areas within the region of interest (e.g., if the "AND" returns a non-zero value), then the data comparer 114 may generate region determination data 108 indicating this result. Otherwise (e.g., if the "AND" returns all zeros), the data comparer 114 may generate region determination data 108 that indicates the target location is not within the region. The process may be repeated for other potential regions, as described in great detail below.

Example Process for Identifying Regions That Include A Target Location

Figure 2:
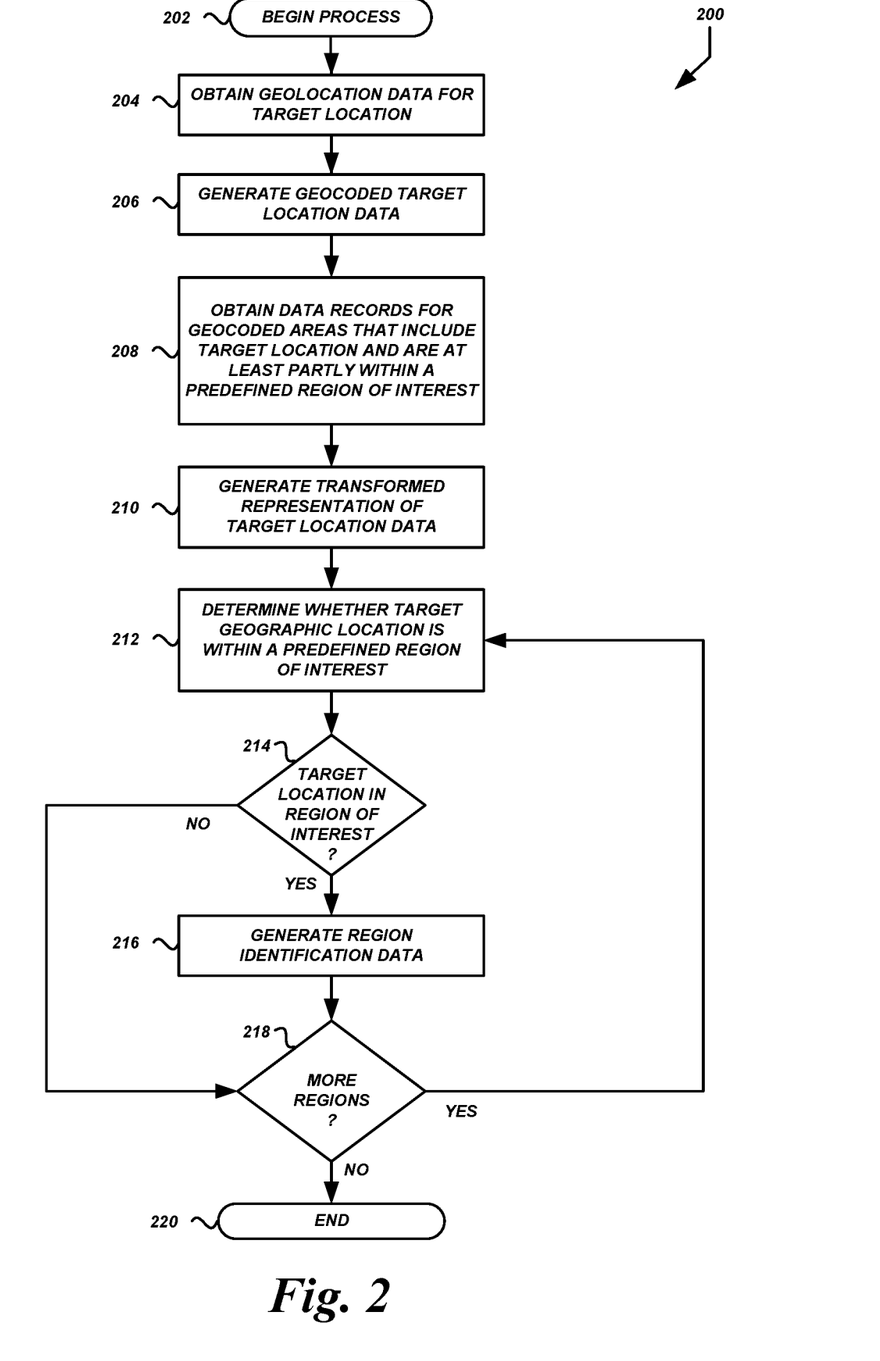
FIG. 2 is a flow diagram of an illustrative process for identifying geographic regions containing a particular geographic location according to some embodiments.

FIG. 2 is a flow diagram of an illustrative process 200 that may be executed by a region identification system 100 to identify one or more regions that include a particular target location. The process 200 will be described in connection with the example geocode hierarchy shown in FIGS. 3 and 4, the example data records shown in FIG. 5, and the example transformation of geocoded data shown in FIG. 6. However, the examples are for illustration only, and are not intended to be limiting. In some embodiments, the process 200 or portions thereof may be used in connection with different geocode hierarchies or data structures, different transformations, different data storage records, etc.

Advantageously, the region identification system 100 may implement the process 200 using a hierarchy of geocoded areas that are present in various regions of interest. Records for high or intermediate level geocoded areas may be stored in connection with compressed, simplified, filtered, encoded, or otherwise transformed representations of corresponding component areas that are within regions of interest, thus obviating the necessity of storing and retrieving separate records for each of the corresponding component areas that are within regions of interest. Additionally, the data structures and methods described below allow an improvement in caching hit rate and/or a reduction in cache size.

The process 200 shown in FIG. 2 begins at block 202. The process 200 may begin in response to an event, such as when a request is received to identify one or more regions of interest in which a particular target geographic location may be located. When the process 400 is initiated, a set of executable program instructions stored on one or more non-transitory computer-readable media (e.g., hard drive, flash memory, removable media, etc.) may be loaded into memory (e.g., random access memory or "RAM") of a computing device of the region identification system 100, such as the computing device 700 shown in FIG. 7. The executable instructions may then be executed by a hardware-based computer processor (e.g., a central processing unit or "CPU") of the computing device. In some embodiments, the process 200 or portions thereof may be implemented on multiple processors, serially or in parallel.

Figure 7:
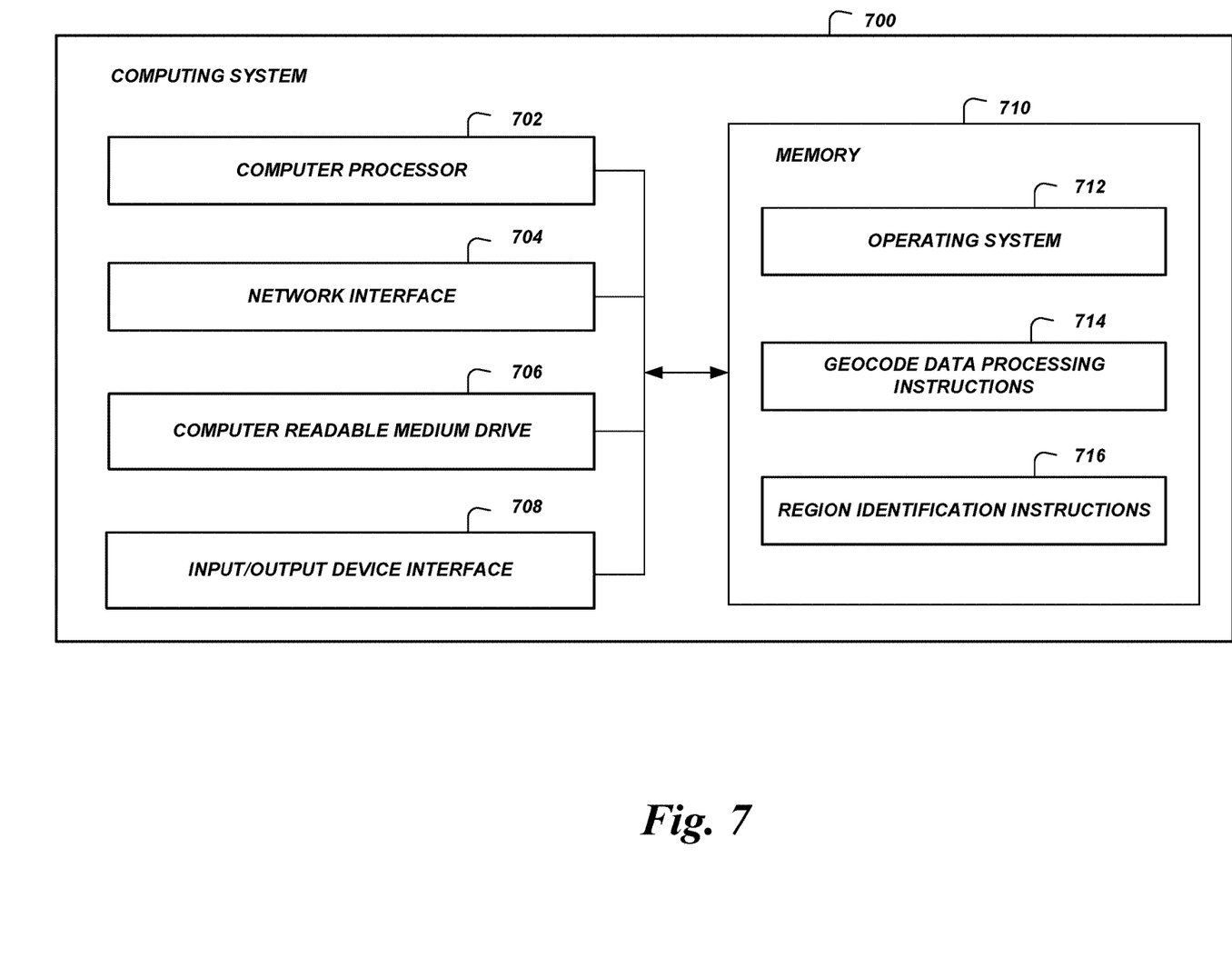
FIG. 7 is a block diagram of an illustrative computing device configured to implement geographic region identification according to some embodiments.

At block 204, a computing device 700 or some other module or component of the region identification system 100 can obtain geolocation data regarding a particular location, also referred to as a target location. In some embodiments the geolocation data may include latitude/longitude coordinates for the target location, a mailing address for the target location, or some other information identifying the target location.

Figure 3:
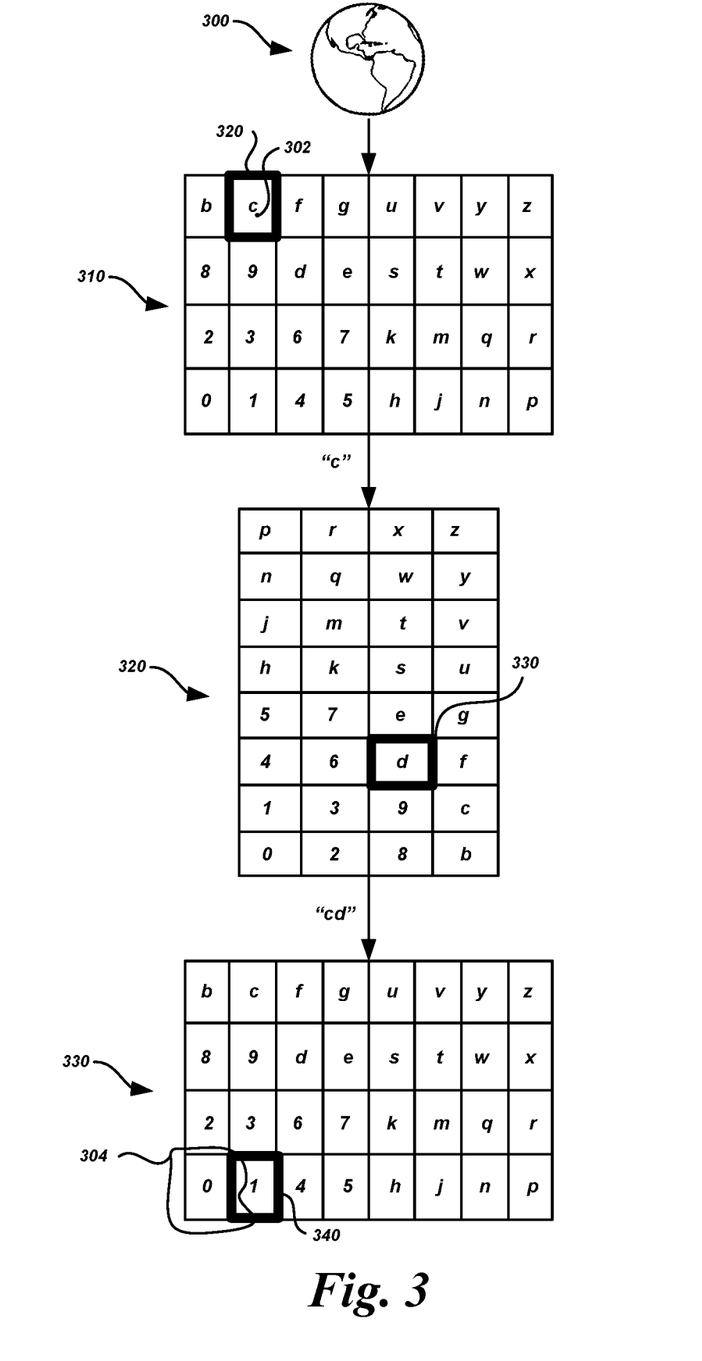
FIG. 3 is a conceptual diagram showing illustrative relationships between levels of a multi-level geocode hierarchy according to some embodiments.
Figure 4:
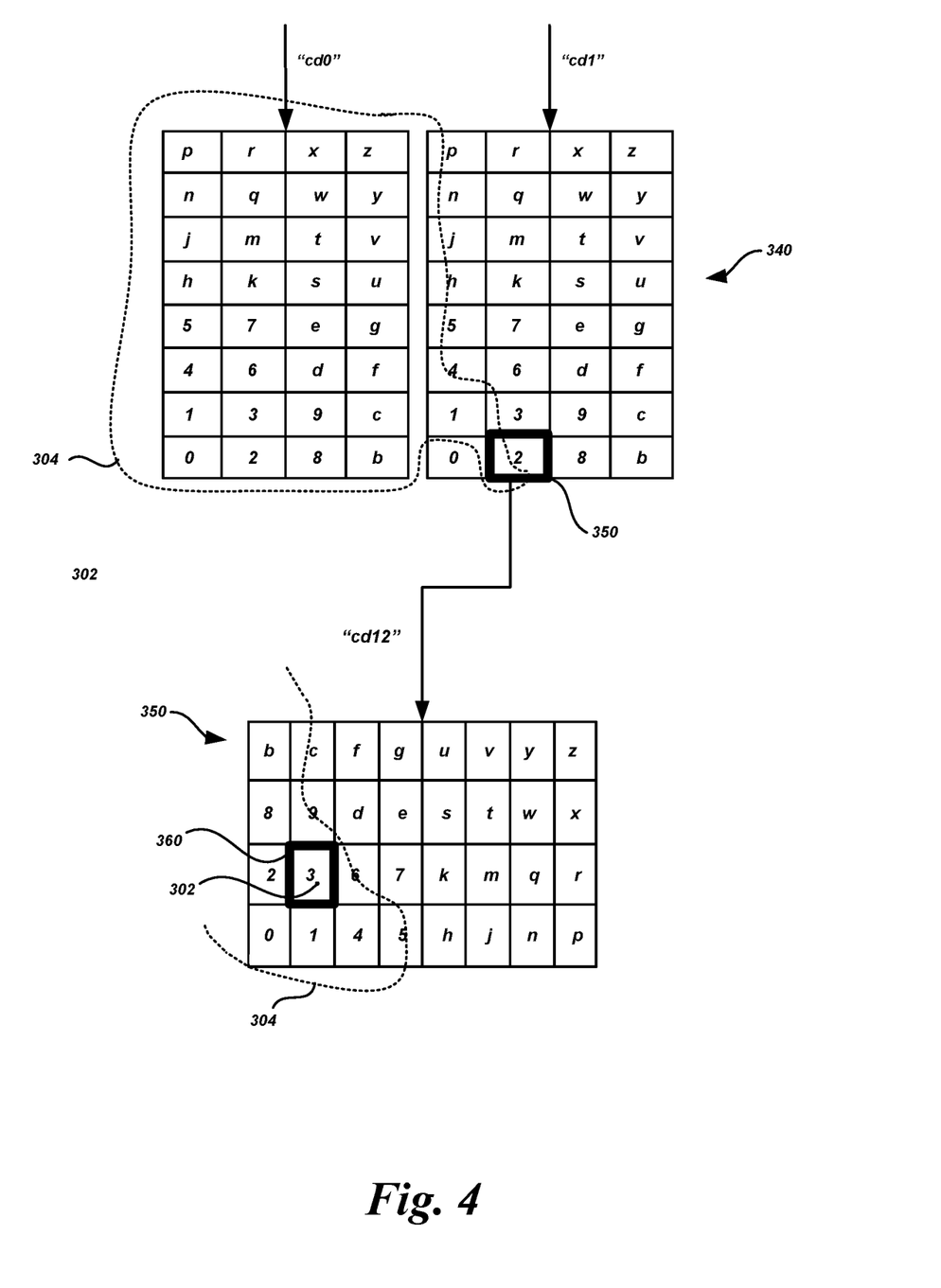
FIG. 4 is a conceptual diagram showing illustrative relationships between levels of a multi-level geocode hierarchy according to some embodiments.

At block 206, a computing device 700 or some other module or component of the region identification system 100 can convert the geolocation data into a form that can be used to obtain data records for the areas of a multi-level hierarchy that include the target location. In some embodiments, the conversion can be into a geocode representation, such as a geohash, S2 cell identifier, or the like. The geocoded representation of the geolocation data, which may be referred to as a geocoded target location identifier, may identify a particular component area at a low level of the hierarchy, and may include information that can be used to identify corresponding higher levels of the hierarchy that include the low level component area. FIGS. 3 and 4 show an example hierarchy of geocoded regions and illustrate these properties.

As shown in FIG. 3, a geographical area, such as then entire surface of the Earth 300, can be represented as a grid 310 of top-level component areas. If the particular geocoding method being used is a geohash based method, then the grid 310 may include 32 top-level component areas. Each component area may be identified by a different base-32 character (e.g., a character from the set {0, 1, 2, 3, 4, 5, 6, 7, 8, 9, b, c, d, e, f, g, h, j, k, m, n, p, q, r, s, t, u, v, w, x, y, z}).

In the present example, the target location 302 is identified by the geohash "cd1234567." The first character of the target area geohash ("c" in this example) indicates that the target location 302 (or, more specifically, the target area geohash "cd1234567") is located in component area "c" 320, which is a first level component area (e.g., in the top level of the hierarchy).

The total area of component area "c" 320 can be represented as a grid of smaller component areas, with each smaller component area identified by a geohash formed by prefixing the base-32 character "c" onto a different base-32 character. In this case, the target area geohash "cd1234567" indicates the target location 302 is in component area "cd" 330, which is a second level component area (e.g., in the second level of the hierarchy).

The total area of second-level component area "cd" 330 can be represented as a grid of smaller component areas, with each smaller component area identified by a geohash formed by prefixing the base-32 characters "cd" onto a different base-32 character. In this case, the target area geohash "cd1234567" indicates the target location 302 is in component area "cd1" 340, which is a third level component area. In addition, there is a region of interest—region 304—that encompasses all or part of component areas "cd0" 342 and "cd1" 340.

As shown in FIG. 4, the total area of third-level component areas "cd0" 342 and "cd1" 340 can each be represented as a grid of smaller component areas, with each smaller component area identified by a geohash formed by prefixing the base-32 characters "cd0" or "cd1," respectively, onto a different base-32 character. In this case, the target area geohash "cd1234567" indicates the target location 302 is in component area "cd12" 350, which is a fourth-level component area. In addition, region 304 encompasses part of component area "cd12" 350 (in addition to other component areas).

The total area of fourth-level component area "cd12" 350 can be represented as a grid of smaller component areas, with each smaller component area identified by a geohash formed by prefixing the base-32 characters "cd12" onto a different base-32 character. In this case, the target area geohash "cd1234567" indicates the target location 302 is in component area "cd123" 360, which is a fifth-level component area. In addition, region 304 encompasses all of component area "cd123" 360 (in addition to other component areas). Therefore, as will be described below, region 304 can be identified as including the target location 302. Put differently, the target location 302 can be said to be within region 304 because component area "cd123" 360 is entirely within region 304 and target location 302 is within component area "cd123" 360.

Returning to FIG. 2, at block 208 a computing device 700 or some other module or component of the region identification system 100 can obtain data records for component areas that (1) include the target location, and (2) are at least partially within a region of interest. In some embodiments, data records for mid-to-high level component areas are obtained, rather than data records for component areas at all levels of the hierarchy or data records for component areas at the lowest level of the hierarchy. This can advantageously reduce the number of records that are stored, retrieved, and processed during region identification. In addition, individual data records can include compressed, simplified, filtered, encoded, or otherwise transformed representations of component areas that are at lower levels of the hierarchy and that are entirely contained within a region of interest. Thus, the reduction in the total number of data records stored, retrieved, and processed does not require a sacrifice of the accuracy realized by defining regions of interest at fine-grained low levels of the hierarchy.

In some embodiments, the data records may be accessed by using the first x base-32 characters of the geocoded target location identifier (where x is a positive integer) to retrieve the records for component areas that are at level x of the hierarchy and that include the target location. Returning to the example above, if the data records to be accessed are for third level component areas, then data records for component areas matching the first three base-32 characters of the geocoded target location identifier may be retrieved. The data records may be keyed on component areas and regions of interest. Thus, a separate data record may be accessed for each region that at least partially encompasses the third level component area in which the target location is located. In some embodiments, the data records can be accessed from the data server 120, or from a local cache 112. For example, the region identification system 100 can first check the local cache 112 for data records for component areas matching the first x characters of the geocoded target location identifier. If there is no match, then the region identification system 100 can request records from the data server 120. Advantageously, because data records for higher-level component areas are used, more cache hits may occur because the higher-level component areas are larger and encompass more target geographic regions.

Figure 5:
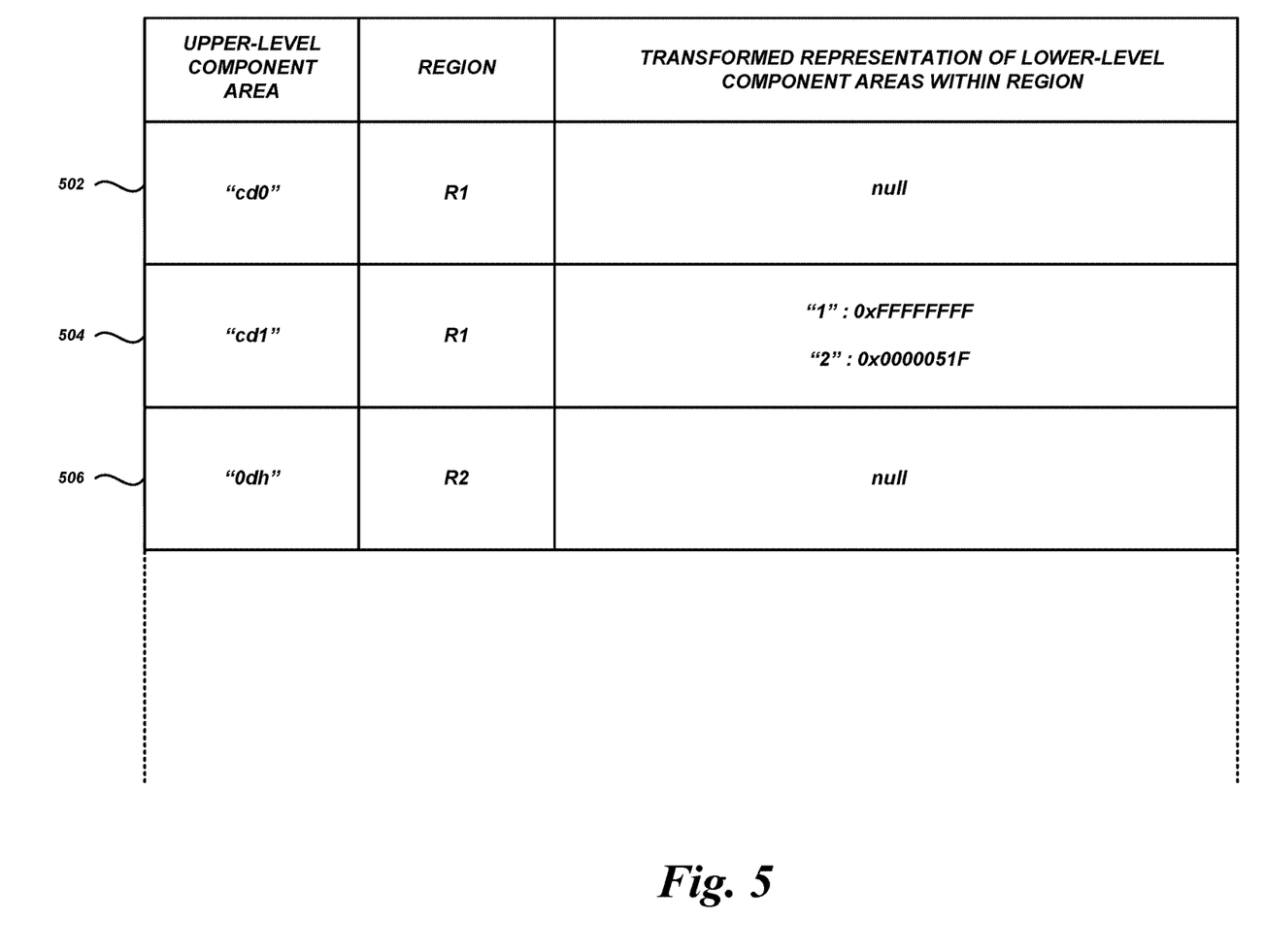
FIG. 5 is a conceptual diagram of illustrative database records storing information about high-level geocoded areas and transformed representations of the lower-level geocoded areas that correspond to particular regions according to some embodiments.

FIG. 5 shows illustrative data records storing information about geocoded areas and also transformed representations of the lower-level geocoded areas that correspond to particular regions. As shown, the records 502, 504, and 506 include values for (1) a geocoded component area at a particular hierarchical level, (2) the region of interest that at least partially encompasses the geocoded component area, and, in some cases, (3) a transformed representation of the lower-level component areas that are entirely within the region of interest. In this example, where the geocoded target location identifier is the geohash "cd1234567," record 504 may be accessed because it is the only record shown for the level three component area that includes the target location.

In some embodiments, sets of data records may be created and stored for multiple different levels of the geocode hierarchy. For example, data records may be created for both level three component areas (with transformed representations of levels four and five component areas) and also level six component areas (with transformed representations of levels seven, eight, and nine component areas). A particular region of interest may be defined in terms of both levels of records, such as when the region is a complex polygon that is capable of representation by (or is best represented by) combinations of level three component areas, level four component areas, level five component areas, level six component areas, level seven component areas, level eight component areas, and/or level nine component areas.

Figure 6:
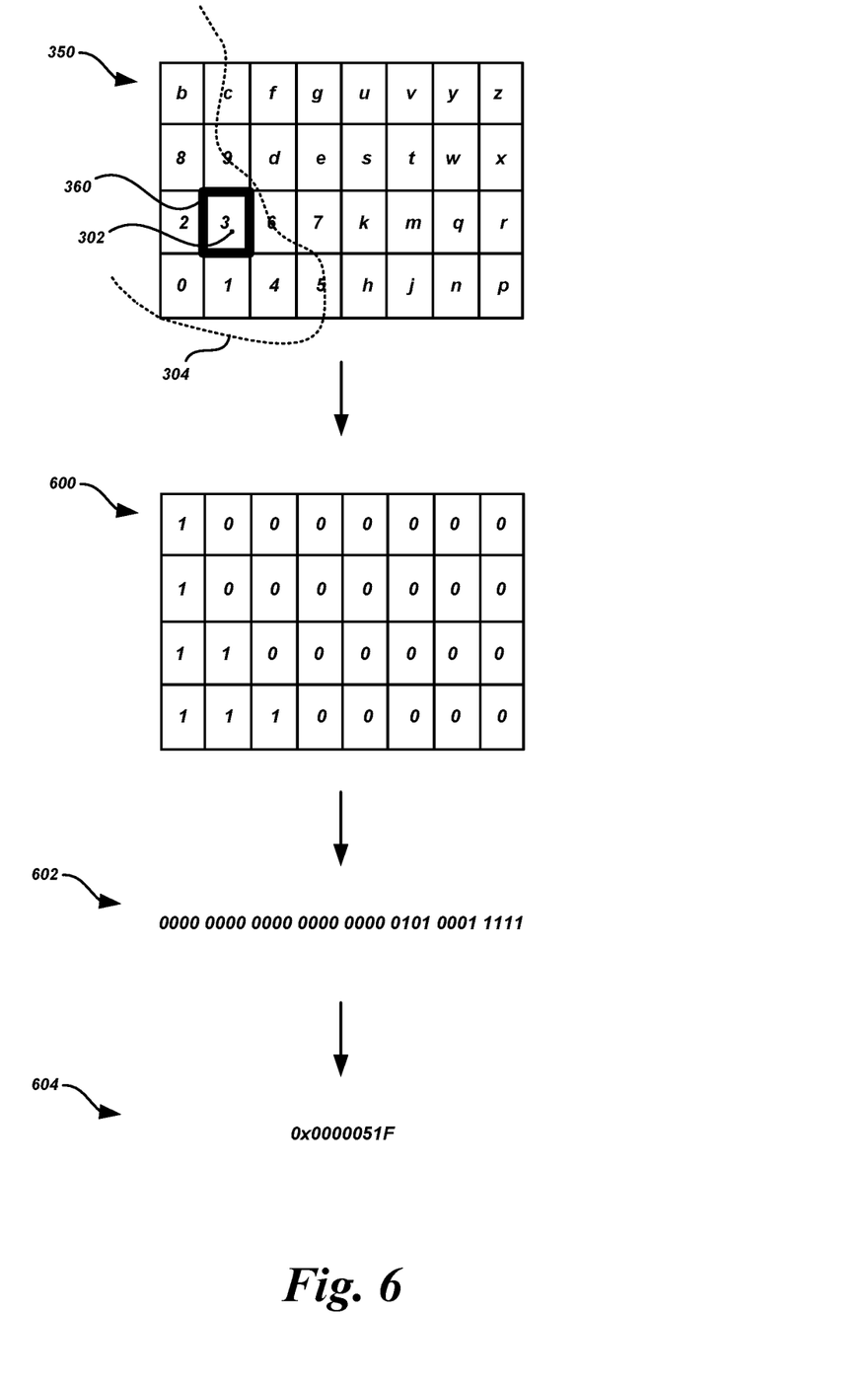
FIG. 6 is a conceptual diagram showing an illustrative data representation of lower-level geocoded areas according to some embodiments.

FIG. 6 shows an illustrative geocoded component area 350, portions of which are within a region of interest 304, transformed into a representation of the lower-level component areas that are entirely within the region of interest 304. As shown, a value grid 600 representing the geocoded component area 350 may be composed. In the grid 600, each lower-level component area that is within the region 304 is represented by a 1, and each lower-level component area that is not within the region 304 is represented by a 0. The values in the grid 600 may by arranged in a sequential representation 602 (shown from right to left, with the right-most position corresponding to component area 0 in the lower left corner of the grid 600). As shown, the sequential representation 602 may be an array of bits representing the grid 600, and thus representing the geocoded component area 350. In this example, the array includes 32 bits, one for each square of the grid 600. As described above, a representation of the lower-level component areas within the region of interest 304 may be stored in the data record 504. In some embodiments, the stored representation may be the sequential representation 602, a hexadecimal representation 604 of the sequential representation, or as some other transformed representation.

Returning to FIG. 2, at block 210 a computing device 700 or some other module or component of the region identification system 100 can generate a representation of the geocoded target location identifier that can be compared with the transformed representation of lower-level component areas within the region of interest 304. In some embodiments, the geocoded target location identifier can be transformed into a similar representation, such as a string or array of bits. In the present example, the geocoded target location is in a fifth level component area represented by the geohash "cd123." The representation of the geocoded target location may therefore set the bit corresponding to the fifth level base-32 character ("3" in this case) to 1, and all other bits of the array may be set to 0.

At block 212, a computing device 700 or some other module or component of the region identification system 100 can determine whether the target geographic location is in a region of interest, using the transformed representation component areas within the region of interest 304 and the transformed representation of the geocoded target location. In some embodiments, if both of the representations are bit arrays, a bitwise AND operation may be performed to determine whether there is any co-occurrence of a value of 1 in corresponding locations in each representation. Such a co-occurrence would indicate that the geocoded target location identifier corresponds to an area within the region of interest 304.

At decision block 214, a computing device 700 or some other module or component of the region identification system 100 can determine whether the outcome of the operation performed above indicates the geocoded target location identifier corresponds to an area within the region of interest 304. If not, the process 200 can proceed to decision block 218 and determine whether there are additional records, and therefore additional potential regions of interest, to process. Otherwise, if the operation performed above indicates the geocoded target location identifier corresponds to an area within the region of interest 304, then the process can proceed to block 216.

At block 216, a computing device 700 or some other module or component of the region identification system 100 can generate data indicating the target geographic location is within the region of interest 304. In some embodiments, generating such data may include transmitting a response message (e.g., to another system that will use the results), storing data (e.g., in the data store 122 or some other data store), or the like. Alternatively or in addition, the region identification system 100 may initiate a process using the identified region, such as determining delivery times or taxes based on the identified region, determining a marketing region (e.g., to determine which local offers to select), etc.

At decision block 218, a computing device 700 or some other module or component of the region identification system 100 can determine whether there are more potential regions of interest in which the target geographic region may be located. For example, there may be multiple data records retrieved at block 208, corresponding to multiple potential regions in which the target geographic region may be located. If there are potentially additional regions, the process 200 may return to block 212 as needed. Otherwise, the process 200 may terminate at block 220.

Execution Environment

FIG. 7 illustrates an example computing system 700 configured to execute the processes and implement the features described above. In some embodiments, the computing system 700 may include: one or more computer processors 702, such as physical central processing units ("CPUs"); one or more network interfaces 704, such as a network interface cards ("NICs"); one or more computer readable medium drives 706, such as high density disk drives ("HDDs"), solid state drives ("SDDs"), flash drives, and/or other persistent non-transitory computer-readable media; an input/output device interface 708, such as an IO interface in communication with one or more external storage drives; and one or more computer readable memories 710, such as random access memory ("RAM") and/or other volatile non-transitory computer-readable media.

The network interface 704 can provide connectivity to one or more networks or computing systems, such as a data server 120. The computer processor 702 can receive information and instructions from other computing systems or services via the network interface 704. The network interface 704 can also store data directly to the computer-readable memory 710. The computer processor 702 can communicate to and from the computer-readable memory 710, execute instructions and process data in the computer readable memory 710, etc.

The computer readable memory 710 may include computer program instructions that the computer processor 702 executes in order to implement one or more embodiments. The computer readable memory 710 can store an operating system 712 that provides computer program instructions for use by the computer processor 702 in the general administration and operation of the computing system 700. The computer readable memory 710 can further include computer program instructions and other information for implementing aspects of the present disclosure. For example, in one embodiment, the computer-readable memory 710 may include a set of geocode data processing instructions 714 that, e.g., implement the geocoding and comparison operations of the process 200. As another example, the computer-readable memory 710 may also or alternatively include a set of region identification instructions 716 that, e.g., implement the region-specific operations of the process 200, manage the process 200, etc.

In some embodiments, multiple computing systems 700 may communicate with each other via their respective network interfaces 704, and can implement data storage or streaming authentication independently (e.g., each computing system 700 may execute one or more separate instances of the process 200), in parallel (e.g., each computing system 700 may execute a portion of a single instance of a process 200), etc. For example, a distributed computing environment may provide hosted capabilities for implementing the systems and methods described herein.

Terminology

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or combinations of electronic hardware and computer software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system comprising:
   a computer-readable memory storing executable instructions; and
   one or more processors in communication with the computer-readable memory and programmed by the executable instructions to at least:
     receive a request to determine one or more predefined regions in which a target geographic location is located, wherein the request comprises a location identifier of the target geographic location;
     retrieve a data record comprising data regarding a first component area of an intermediate level of a multi-level hierarchy of geographic areas, wherein the data record is retrieved based on at least a portion of an identifier of the first component area, encoded in a first encoding type, corresponding to at least a portion of the location identifier of the target geographic location encoded in the first encoding type, wherein the first component area comprises a plurality of lower-level component areas, wherein the data record further comprises a first encoded array representing one or more component areas, of the plurality of lower-level component areas, present in both the first component area and a predefined region, and wherein the first encoded array is encoded in a second encoding type;
     encode the at least portion of the location identifier of the target geographic location into a second encoded array representing a second component area, of the plurality of lower level component areas, comprising the target geographic location, wherein the second encoded array is encoded in the second encoding type;
     determine, using the first encoded array and the second encoded array, that the target geographic location is in the predefined region based at least on the second component area being one of the one or more component areas present in both the first component area and the predefined region; and
     generate a response to the request, the response identifying the predefined region as including the target geographic location.

2. The system of claim 1, wherein the first encoded array comprises a first bit array, wherein the second encoded array comprises a second bit array, and wherein the executable instructions to determine that the target geographic location is in the predefined region comprise executable instructions to perform a bitwise AND operation using the first bit array and the second bit array.

3. The system of claim 1, wherein the one or more processors are programmed by the executable instructions to retrieve data records for fewer than all levels of the multi-level hierarchy.

4. The system of claim 1, further comprising a local data cache, wherein the executable instructions to retrieve the data record comprise executable instructions to retrieve the data record from the local data cache.

5. A computer-implemented method, as performed by a computing system configured to execute specific instructions, comprising:
   receiving a request to determine one or more predefined regions in which a target geographic location is located, wherein the request comprises a location identifier of the target geographic location;
   selecting a data record, regarding a geographic area of an intermediate level of a multi-level hierarchy of geographic areas, based at least on a portion of an identifier of the geographic area, encoded in a first encoding type, corresponding to at least a portion of the identifier of the target geographic location encoded in the first encoding type, wherein the geographic area comprises a plurality of component geographic areas within the geographic area, and wherein the data record comprises a compressed representation of a subset of the plurality of component areas encoded in a second encoding type, the subset comprising component geographic areas that are within a predefined region;
   determining, using the compressed representation of the subset and an encoded representation of the target geographic location, that the target geographic location is in the predefined region, wherein the encoded representation of the target geographic location is encoded in the second encoding type; and
   generating a response to the request, the response comprising data indicating the target geographic location is in the predefined region.

6. The computer-implemented method of claim 5, further comprising generating the identifier of the target geographic location in the first encoding type as a geocoded representation of the target geographic location, wherein the geocoded representation comprises a plurality of characters, and individual characters of the plurality of characters correspond to a respective component area of a geocode hierarchy level in which the target geographic location is boated.

7. The computer-implemented method of claim 6, wherein the selecting the data record is based at least on a character of the geocoded representation of the target geographic location corresponding to a character of the identifier of the geographic area.

8. The computer-implemented method of claim 6, wherein the generating the identifier of the target geographic location in the first encoding type comprises generating a geohash of the target geographic location.

9. The computer-implemented method of claim 5, further comprising generating the encoded representation of the target geographic location in the second encoding type as a bit array, the bit array comprising a separate bit for individual component areas at a lower level of a geocode hierarchy than the geographic area, wherein a bit for a respective component area in which the predefined region is located is set to a value indicating the predefined region is located in the respective component area.

10. The computer-implemented method of claim 9, wherein the determining that the target geographic location is in the predefined region comprises performing a comparison operation using the bit array and the compressed representation of the subset of the plurality of component areas.

11. The computer-implemented method of claim 5, wherein the determining, using the compressed representation of the subset of the plurality of component areas and the encoded representation of the target geographic location, that the target geographic location is in the predefined region comprises using at least one of:
a bit array representation of the subset,
a prefix hash tree representation of the subset, or
a trie representation of the subset.

12. The computer-implemented method of claim 5, wherein the selecting the data record comprises selecting the data record from a cache local to the computing system.

13. The computer-implemented method of claim 5, wherein the determining that the target geographic location is in the predefined region comprises determining that that the target geographic location is in at least one of:
a tax region,
a delivery region,
a governmental jurisdiction, or
a marketing region.

14. The computer-implemented method of claim 5, further comprising:
selecting a second data record regarding a second geographic area based at least on the second geographic area including the target geographic location, wherein the second data record comprises a second compressed representation of a second subset of a plurality of component areas of the second geographic area, the second subset comprising component geographic areas that are within a second predefined region; and
determining, using the second compressed representation of the second subset and the encoded representation of the target geographic location, that the target geographic location is in the second redefined region, wherein the response comprises data indicating the target geographic location is in the second predefined region.

15. One or more non-transitory computer readable media comprising executable code that configures a computing system to at least:
receive a request to determine one or more predefined regions in which a target geographic location is located, wherein the request comprises a location identifier of the target geographic location;
select a data record, regarding a geographic area of an intermediate level of a multi-level hierarchy of geographic areas, based on at least a portion of a geohash-encoded identifier of the geographic area corresponding to at least a portion of the location identifier, encoded in a geohash encoding type, of the target geographic location, wherein the geographic area comprises a plurality of component geographic areas within the geographic area, and wherein the data record comprises a compressed representation of a subset of the plurality of component areas encoded in a second encoding type different than the geohash encoding type, the subset comprising component geographic areas that are within a predefined region;
determine, using the compressed representation of the subset and a second encoded representation of the target geographic location, that the target geographic location is in the predefined region, wherein the second encoded representation of the target geographic location is encoded in the second encoding type; and
generate a response to the request, the response comprising data indicating the target geographic location is in the predefined region.

16. The one or more non-transitory computer readable media of claim 15, wherein the geohash-encoded identifier of the target geographic location comprises a plurality of characters, and wherein individual characters of the plurality of characters correspond to a respective component area of a geocode hierarchy level in which the target geographic location is located.

17. The one or more non-transitory computer readable media of claim 15, wherein the executable code further configures the computing system to generate the second encoded representation of the target geographic location in the second encoding type as a bit array, the bit array comprising a separate bit for individual component areas at a lower level of a geocode hierarchy than the geographic area, wherein a bit for a respective component area in which the target geographic location is located is set to a value indicating the target geographic location is located in the respective component area.

18. The one or more non-transitory computer readable media of claim 17, wherein the executable code to determine that the target geographical location is in the predefined region comprises executable code to perform a comparison operation using the bit array and the compressed representation of the subset of the plurality of component areas.

19. The one or more non-transitory computer readable media of claim 15, wherein the executable code to determine that the target geographic location is in the predefined region comprises executable code to determine that that the target geographic location is in at least one of:
a tax region,
a delivery region, or
a governmental jurisdiction.

20. The one or more non-transitory computer readable media of claim 15, wherein the executable code further configures the computing system to:
select a second data record regarding a second geographic area based at least on the second geographic area including the target geographic location, wherein the second data record comprises a second compressed representation of a second subset of a plurality of component areas of the second geographic area, the second subset comprising component geographic areas that are within a second predefined region; and
determine, using the second compressed representation of the second subset and the second encoded representation of the target geographic location, that the target geographic location is in the second predefined region, wherein the response comprises data indicating the target geographic location is in the second predefined region.

* * * * *

UNITED STATES PATENT AND TRADEMARK OFFICE
CERTIFICATE OF CORRECTION

PATENT NO.       : 10,810,235 B1
APPLICATION NO.  : 15/618901
DATED            : October 20, 2020
INVENTOR(S)      : Hrishikesh Bakshi Page 1 of 1

It is certified that error appears in the above-identified patent and that said Letters Patent is hereby corrected as shown below:

In the Claims

In Column 14, Line 56, Claim 6, delete "boated." and insert --located.--.

In Column 16, Line 35 (approx.), Claim 18, delete "geographical" and insert --geographic--.

Signed and Sealed this
Fifteenth Day of December, 2020

Andrei Iancu
*Director of the United States Patent and Trademark Office*